UNITED STATES PATENT OFFICE.

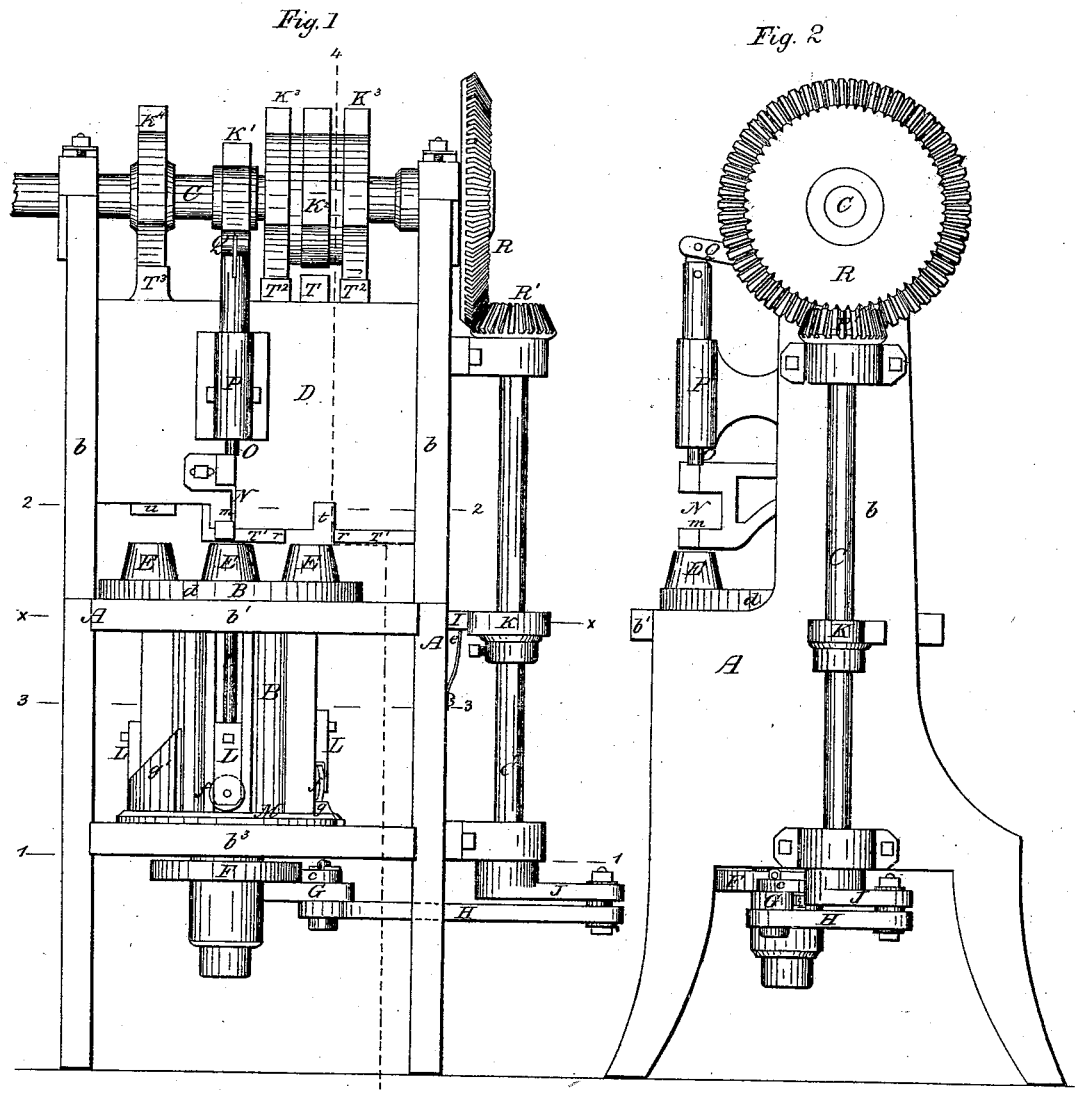

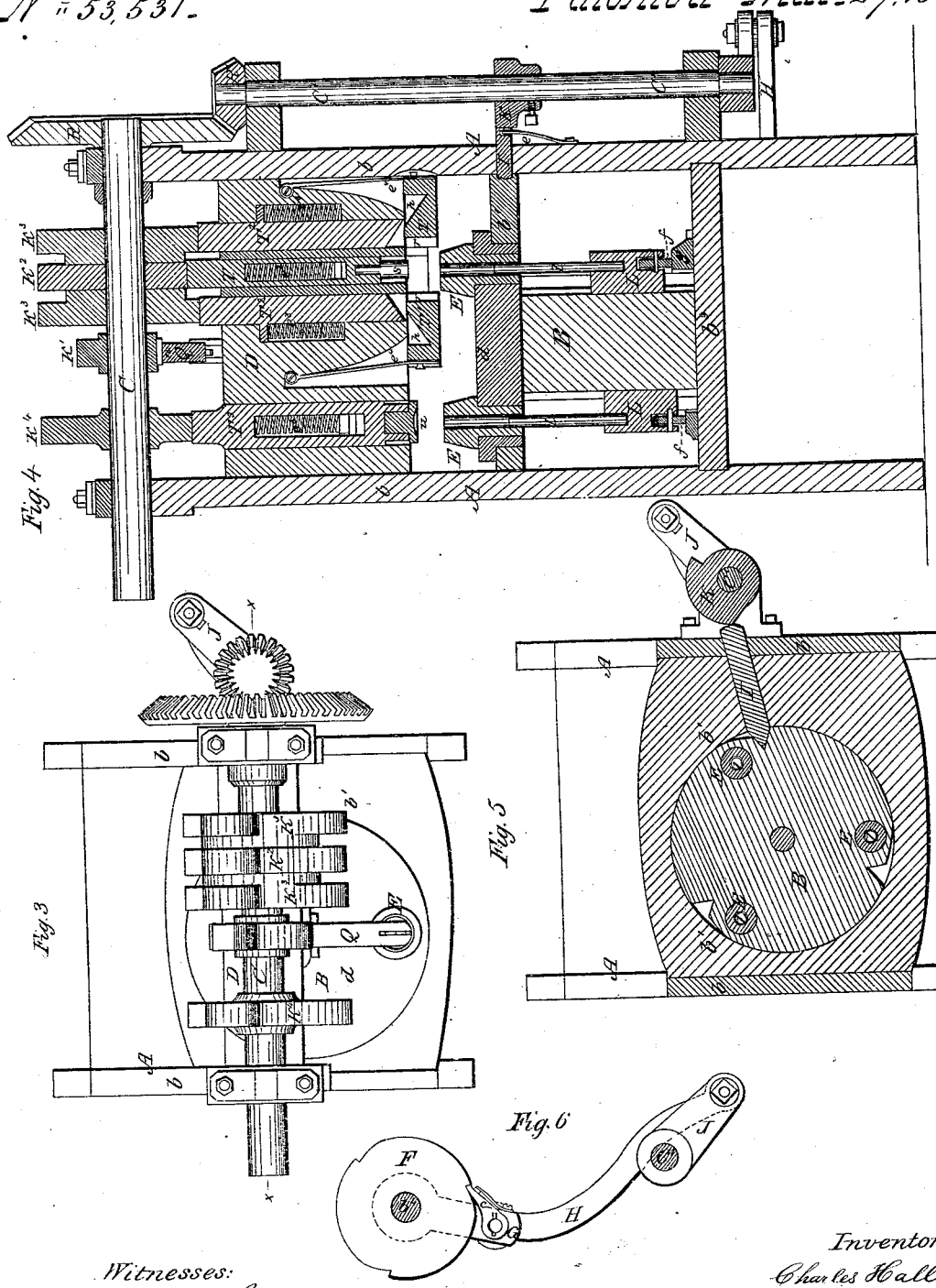

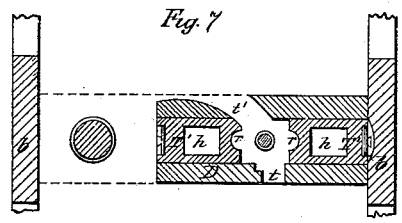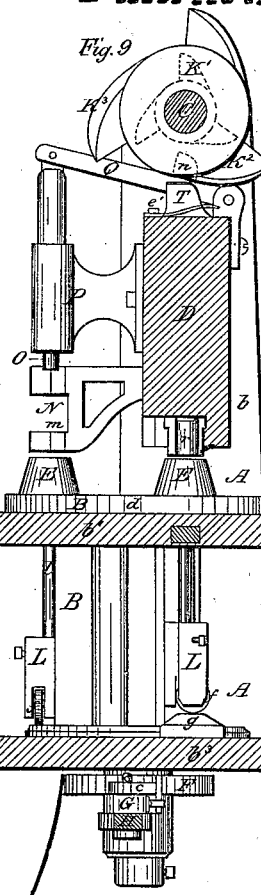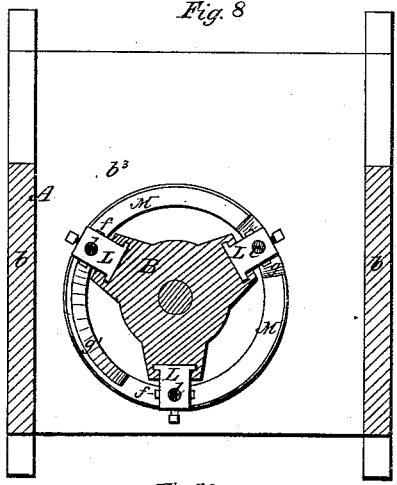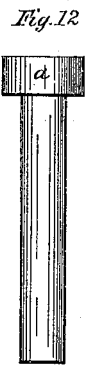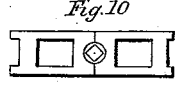

CHARLES HALL AND EMIL HUBNER, OF NEW YORK, N. Y., ASSIGNORS, BY MESNE ASSIGNMENTS, TO CHAS. HALL AND J. D. VAN VOORHIS.

IMPROVED MACHINE FOR MAKING BOLTS.

Specification forming part of Letters Patent No. 53,531, dated March 27, 1866.

*To all whom it may concern:*

Be it known that we, CHARLES HALL and EMIL HUBNER, of the city, county, and State of New York, have invented certain new and useful Improvements in Machines for Making Bolt-Blanks and other Similar Articles; and we do hereby declare that the following is a full, clear, and exact description of our invention, reference being had to the accompanying drawings, in which—

Figure 1 represents a front elevation of a machine embodying our improvements. Fig. 2 represents a side elevation of the same. Fig. 3 represents a plan of the machine. Fig. 4 represents a vertical section of it at the line *x x* of Fig. 3. Fig. 5 represents a horizontal section of it at the line *x x* of Fig. 1, and Figs. 6, 7, and 8, similar sections at the lines 1 1, 2 2, and 3 3 of Fig. 1. Fig. 9 represents a vertical transverse section of it at the line 4 4 of Fig. 1, and Fig. 10 represents a plan of socket-jaws of different form from those represented upon the machine. Figs. 11, 12, and 13 represent elevations of a bolt-blank of full size in different stages of its formation; and Figs. 14, 15, and 16 represent similar elevations of a bolt-blank of full size with a head of different form.

The heads of many bolts used in the mechanical arts are much larger in diameter than the stems of the bolts, and such bolts are frequently made of metal rods of the size of their stems by compressing the metal in the direction of the length of the rod, or "upsetting" it, as this operation is technically termed, so as to cause it to expand in diameter or swell. Machines have been devised to make such bolt-heads by forcing a die of the proper size directly endwise against the rod, which is held in a socket with its end projecting therefrom toward the heading-die. When the relative diameters of the head and stem of the bolt do not differ more than a certain amount, the bolt-head may be formed satisfactorily by such machines; but when the size of the head as compared with the stem exceeds a certain proportion, the metal in upsetting tends to incline to one side, and consequently the heads produced by such machines are not perfect or symmetrical.

The object of our invention is to enable perfectly-formed bolt-heads to be produced by machinery, and the machine represented in the accompanying drawings is an example of the best form we have thus far devised to embody our improvements. This machine is intented to form headed bolt-blanks, ready for screwing, from straight pieces of rods presented to it, and its general operation is as follows: The straight piece, such as shown at Figs. 11 and 14, previously cut from a rod of uniform section throughout and heated to a white heat, is presented to the machine by an attendant and is received in a tubular die which holds it and presents it, successively, to a set of preparing-dies and to a finishing-die. The preparing-dies upset the end of the rod in a socket or mold, so as to form a symmetrical drum-head, such as shown at *a*, Figs. 12 and 15, of less diameter than the finished head and greater thickness, while the finishing-die upsets the drum-head produced by the preparing-dies, thereby causing it to expand in diameter, and imparts to it the finished form, such as shown at *a'*, Figs. 13 and 16. After the head is thus completed the bolt-blank is ejected from the tubular die. In the present example the presentation of the piece successively to the preparing-dies and the finishing-die is effected by arranging the tubular die to revolve beneath these dies, so as to carry the piece from one to the other; but, as will be hereinafter seen, this arrangement may be modified.

The first part of the invention consists of the combination of the preparing-dies and the finishing-die with a tubular die, which holds the blank while it is operated upon successively by the preparing-dies and finishing-die, and with a carriage, by the movement of which the preparing-dies and finishing-die are permitted to act in succession upon the piece.

The second part of the invention consists of the combination of the subject-matter of the first part of the invention with the carriage, (which permits the successive action of the preparing and finishing dies upon the bolt-blank,) with the shaft of the cams, or their equivalents, that operate the said dies in such manner that the carriage is moved intermittently, thus affording periods of rest during which the dies operate.

The third part of the invention consists of the combination of the first part of our invention with a movable gage which determines the projection of the end of the blank beyond the tubular die that holds it, so as to regulate the extent to which the end is upset at each operation.

The fourth part of the invention consists of the combination of the subject-matter of the first part of the invention and the carriage of the bolt-machine with a stop operated by a cam, or its equivalent, to hold the carriage at rest when the bolt-blank is in the proper position for the dies to prepare and complete the head.

The fifth part of the invention consists of the combination of the first part of the invention with the movable gage (which determines the projection of the blank from the socket die) and a cam, or its equivalent, for causing it to eject the blank after the head is completed.

The sixth part of the invention consists of the combination of the first part of the invention with a guide and piston to push the piece into the tubular die, in which it is held during the operation of the preparing and finishing dies.

The various moving parts of the bolt-machine are supported by a strong frame, A A, whose standards $b\ b$ terminate at their upper ends in pillow-blocks in which the cam-shaft C that operates the preparing and finishing dies is sustained. Below this cam-shaft is the slide-block D, which supports and guides the slides of the preparing and finishing dies, and below this slide-block is the carriage B, which holds the tubular dies and their appurtenances. This carriage has a disk-head, $d$, at its upper end, in which three tubular dies, E E E, are sustained, and which is constructed to turn in a circular opening formed in the cross-plate $b'$ of the frame of the machine. The tubular dies are arranged at equal distances from the center of the carriage-head, and at equal distances from each other, so that the turning of the carriage a third of a revolution at a time places each die successively in the same three positions. The lower end of the carriage is provided with a journal which extends through a bearing formed in the bridge-plate $b^3$ of the frame, and terminates in a driving end, $b^4$, to which a ratchet-wheel, F, is secured. This rachet-wheel has three teeth—the number corresponding with that of the tubular dies—and they are acted upon in succession by a spring-pawl, $c$, which is carried by an arm, G, that is fitted to vibrate upon the driving end of the carriage, and is moved to and fro by a connecting-rod, H, which connects it with the crank-pin of a crank, J, secured to the lower end of an upright revolving shaft, C'. This shaft is supported by pillow-blocks secured to one of the standards of the frame. The throw of the crank is sufficient to cause the spring-pawl $c$ to move to and fro rather more than one third of a revolution, so that after having drawn one tooth of the ratchet-wheel as far forward as possible it is moved far enough back to seize upon the next succeeding tooth.

During the backward movement of the pawl the carriage remains at rest, so that the operation of the pawl upon the ratchet-teeth is to move the carriage intermittently. As the movement of the carriage is rapid its momentum tends to carry it farther than the pawl moves it. In order to stop its movement and to secure it in the exact position it is to occupy during each period of rest, the rim of the disk-head of the carriage has three tapering sockets formed in it at equal distances apart, and a stop, I, is constructed to slide in the cross-plate $b'$ of the frame in the proper position to engage with one of the three sockets when the carriage is at rest. This stop is moved toward the carriage by a cam, K, secured to the upright shaft C', and, as the end of the stop is wedge-formed and the sockets are tapering, the effect of its insertion into a socket by the cam is to bring the carriage to the exact position it is to occupy in case the pawl $c$ has not left it there. A part of the cam K is concentric, so that the stop is retained in the socket in which it is engaged for a period long enough to permit the preparing and finishing dies to operate, after which the stop is withdrawn (to permit the carriage to be moved) by means of a spring, $e$, which acts antagonistically to the cam K.

The sockets and rachet-teeth are so arranged relatively to the tubular dies E that when the movement of the carriage is stopped one of the tubular dies is directly in front of the slide-block D, as seen at Figs. 1, 3, and 9, while the other two are beneath it. The bore of each tubular die is just sufficient to admit the stem of the piece of rod of which the headed bolt-blank is to be formed. Each bore is fitted with a movable gage, $l$, which projects upward into it from a small carriage, L, beneath. Each of these gage-carriages is arranged to slide up and down in a groove formed in the carriage B, and each is fitted with a wheel, $f$, which runs upon a circular track, M, provided with cams $g\ g'$, which cause the gages to enter the bores of the socket-dies greater or less distances, as will be hereinafter described.

In order that the straight blank may be inserted truly into the front tubular die E a guide, N, is provided. This guide has an upright V-formed groove in it, and it is supported directly over the front die in such position that when the straight piece is placed in the groove by the attendant its axis is directly in the line of the bore of the tubular die beneath. The guide has an opening, $m$, in it to admit the jaws of the tongs by which the straight piece is presented to the guide. In order that the piece so presented may be inserted into the tubular die a piston, O, is provided to push it downward. This piston is arranged to slide vertically in a bracket, P, and its upper end is connected with the end of a lever, Q, which is moved downward to depress the piston and push the piece into the tubular die by a cam, K', secured to the cam-shaft C. The cam operates upon a projection, $n$, secured to the lever Q, and when the cam, in its revolution, has passed by this projection the lever is raised to lift the piston by means of a spring, $e'$. The cam-shaft, in this example, revolves but one-third as fast as the crank J, the beveled wheels R R', which connect the cam-shaft C and crank-shaft C', being in the proportion of three to one; hence, as there are three tubular dies, the cam K' has three arms, as shown in dotted lines at Fig. 9, one of which corresponds with each socket-die.

The preparing-dies for forming the preparatory drum-head upon the bolt-blank consists of two lateral dies, $r\ r$, and an upsetting-die, $s$. The upsetting-die $s$ is secured to a slide, T, which is arranged to slide vertically in the slide-block D, and it is operated by means of the three-armed cam $K^2$ secured to the cam-shaft C. The lateral dies $r\ r$ are secured to slides T' T', which are arranged to move horizontally (toward and from the axis of the punch-die) in grooves formed in the lower side of the slide-block D. The faces of these two lateral dies, when moved together, form a socket (see Fig. 7$^a$) of the size and form of the preparatory drum-head to be formed upon the bolt-blank. These lateral socket-dies are caused to converge by means of a pair of vertical slides, $T^2\ T^2$, which are depressed at proper times by a pair of three-armed cams, $K^3\ K^3$, secured to the cam-shaft C. In order that these vertical slides may impart motion to the horizontal slides the lower ends of the former are made wedge-formed, and wedge-formed sockets $h\ h$ are made in the horizontal slides, so that the inclined surface of each vertical slide, acting upon the inclined surface of the corresponding horizontal slide, will push the socket-die toward the axial line of the upsetting-die. As the socket must be made ready before the end of the piece is upset in it, the lateral cams $K^2\ K^3$ are so formed as to move their slides before the punch-cam $K^2$ depresses the upsetting materially, and the rims of the cam-arms are made concentric for a sufficient distance to hold the socket-dies at rest in their converged positions until the upsetting-die has completed its work. When the arms of the upsetting-die cam $K^2$ and lateral cams $K^3\ K^3$ have done their work, the slides T $T^2\ T^2$ are raised by springs $e^2\ e^3\ e^3$, and the socket-dies $r\ r$ are opened to free the bolt-blank by springs $e^4\ e^4$. In order to permit the projecting end of the piece held in the tubular die to pass into the space between the socket-dies, and to permit the drum-head to pass out, two openings, $t\ t'$, are made in the under side of the slide-block D, the former in front and the latter in the rear of the preparing-dies.

The finishing-die $u$ is secured to a slide, $T^3$, arranged to slide vertically in the slide-block D, and operated by a three-armed cam, $K^4$, secured to the cam-shaft C. The face of this finishing-die is the counterpart of the head to be formed upon the bolt-blank, the concavity being round or polygonal, as required, to impart a corresponding form to the head of the bolt-blank. This finishing-die is withdrawn from the bolt-blank by a spring, $e^5$, when the cam in its revolution permits this withdrawal.

The relative positions of the piston O, the preparing-dies $r\ r\ s$, and the finishing-die $u$, correspond with the positions of the three tubular dies E E E when the carriage is at rest, and as the tubular dies are equidistant from each other, and are also equidistant from the axis of the carriage which holds them, the piece held in any one tubular die is subjected, in succession, to the preparing-dies and finishing-die by the intermittent movements of the carriage, and is then moved round toward the piston O. As the bolt-blank is moved toward the piston it is ejected from the tubular die by the gage $l$, which is then raised by means of the stationary cam $g'$, secured in the circular track traversed by the wheel of the gage-carriage. As before stated, the head of the bolt-blank is formed from the portion of the piece of metal $a^2$, Figs. 11 and 14, which projects above the tubular die, and the projection of this portion is determined by the position of the gage which sustains the lower end of the piece.

When bolt-blanks, such as are represented at Fig. 13, are to be formed with a round stem, $a^4$, extending up to the under side of the head, the gage is so operated that the lower end of the piece of metal is maintained in the same position in the socket-die during the operation of the preparing-dies and finishing-die, and the portion $a^2$ of the straight piece projecting above the socket-die is first formed into a drum-head, $a$, Fig. 12, and then this drum-head is upset by the finishing-die and formed into the rivet-head $a'$, Fig. 13. In such cases the circular track M. upon which the gage-carriage wheel runs, must either be continued of the same height from the preparing-dies to the finishing-die, or cam-blocks of equal height must be applied to the circular track beneath the preparing-dies and the finishing-die, to place the gage at the same level during the two operations.

When bolt-blanks, such as are represented at Fig. 16, are to be formed with the part of the stem $a^4$ at the under side of the head squared or enlarged the gage is operated so that the lower end of the blank is permitted to descend in the tubular die during the operation of the finishing-die, so that a portion of the drum-head $a$, Fig. 15, formed by the preparing-dies, is forced downward into the tubular die, the upper end of which is in such cases made the counterpart of the enlargement to be produced under the head of the bolt-blank. The circular track M must also be depressed beneath the finishing-die, so as to permit the gage-wheel $f$, and gage and bolt-blank supported by it to descend the required distance, or a cam-block, $g$, must be applied beneath the preparing-dies, to hold the gage in the proper position while the drum-head is formed, and to permit it to descend before the tubular die reaches its position beneath the finishing-die.

Instead of making the faces of the socket-dies of semi-cylindrical form, as shown in the drawings, they may be made of any other form which it is desirable to impart to the end of the bolt-blank, in order that the finishing-die may act to the best advantage, and if there is to be a polygonal enlargement beneath the head the socket-dies may be so formed as to impart this form, as well as to determine the form of the peparatory drum-head, which is transformed by the finishing-die into the finished head. Thus, for example, the faces of the socket-dies may be partly square and partly cylindrical, as shown at Fig. 10, when a square enlargement is to be formed under the head, and in this case the square enlargement formed in the socket-dies will be received in the squared orifice of the tubular die when the finishing-die operates.

Instead of constructing the carriage to turn upon its axis, it may be constructed to move to and fro beneath the preparing-dies in a straight line. In this case there would be but one tubular die, which would be moved successively beneath a piston to insert the blank, the preparing-dies, and the finishing-die, and would then be drawn back to receive a new blank. The axial lines of the piston, preparing-dies, and finishing-die would also all be in the same plane.

Instead of arranging the tubular dies upon the carriage and the preparing and finishing-dies upon the stationary frame of the machine, the slide-block holding the preparing and finishing dies may be secured to a carriage, and the tubular dies may be arranged upon a fixed part of the frame. In this case the dies would move over the bolt-blank in succession, and the movement of the carriage would be stopped long enough to permit the dies to act. The same arrangement might be applied to a machine with a carriage reciprocating in a straight line, as hereinbefore described. In place of arranging the tubular dies upon the disk-head of a carriage, we sometimes arrange one or more of them upon the cylindrical periphery of a turning-carriage. In this case the axial lines of the tubular dies and the gages are radial lines extending from the axis of the carriage, and the axial lines of the piston, the preparing-dies, and the finishing-dies are also radial lines. In some cases it may be desirable to construct the tubular dies in parts which are arranged to move toward and from each other in manner similar to the preparing-dies r r, so as to gripe the neck of the piece of metal firmly when the preparing or finishing dies are acting, and we propose to adopt this construction whenever circumstances render it expedient.

The movement of the upsetting-die, which upsets the metal into the socket-dies, must be sufficient to make the metal fill up the socket, so that the lower side of the drum-head formed thereby bears firmly upon the face of the tubular die when the finishing-die does its work. Hence when the finishing-die begins to upset the metal the latter, having a base which is supported by the face of the tubular die, cannot incline to one side, but is, of necessity, caused to expand equally at all sides and to form a symmetrical head.

Having thus described the best form of machine which we have thus far devised to embody our improvements, and the several modes in which we have contemplated the application of the principle or character by which our invention may be distinguished from others, what we claim as our invention in bolt-machines, and desire to secure by Letters Patent, is—

1. The combination of the preparing-dies and finishing-die, with the tubular die and carriage, substantially as set forth.

2. The combination of the subject-matter of the first part of the invention, with the carriage of the machine, and with the cam-shaft of the dies, for forming both the preparatory and finished head in such manner that the carriage is moved intermittently, thus affording periods of rest during which the preparatory and finishing dies are operated, substantially as set forth.

3. The combination of the subject-matter of the first part of the invention, with the movable gage, substantially as set forth.

4. The combination of the subject-matter of the first part of the invention and the carriage of the machine, with a stop, operated by a cam, to hold the carriage at rest while the bolt-blank is successively in the proper positions to be acted upon by the several dies, substantially as set forth.

5. The combination of the first part of the invention, with the movable gage of the tubular die, and with a cam, by whose action the gage is caused to expel the bolt-blank, substantially as described.

In witness whereof we have hereunto set our hands this 8th day of February, A. D. 1865.

CHARLES HALL.
      EMIL HUBNER.

Witnesses:
 JAMES D. VAN VOORHIS,
 ADAM WEBER.